(12) United States Patent
Arlazarov et al.

(10) Patent No.: US 12,503,739 B2
(45) Date of Patent: Dec. 23, 2025

(54) METHOD FOR MANUFACTURING A HIGH STRENGTH STEEL PRODUCT AND STEEL PRODUCT THEREBY OBTAINED

(71) Applicant: ArcelorMittal, Luxembourg (LU)

(72) Inventors: Artem Arlazarov, Blenod les Pont-a-Mousson (FR); Kangying Zhu, Metz (FR)

(73) Assignee: ArcelorMittal, Luxembourg (LU)

( * ) Notice: Subject to any disclaimer, the term of this patent is extended or adjusted under 35 U.S.C. 154(b) by 0 days.

(21) Appl. No.: 17/825,332

(22) Filed: May 26, 2022

(65) Prior Publication Data

US 2022/0282348 A1    Sep. 8, 2022

Related U.S. Application Data

(62) Division of application No. 15/526,902, filed as application No. PCT/IB2015/058887 on Nov. 17, 2015, now Pat. No. 11,371,109.

(30) Foreign Application Priority Data

Nov. 18, 2014  (WO) .................. PCT/IB2014/066128

(51) Int. Cl.
  *C21D 8/02*    (2006.01)
  *C21D 1/18*    (2006.01)
  (Continued)

(52) U.S. Cl.
  CPC ............. *C21D 8/0205* (2013.01); *C21D 1/18* (2013.01); *C21D 1/185* (2013.01); *C21D 7/13* (2013.01);
  (Continued)

(58) Field of Classification Search
  CPC .................................................... C21D 8/0205
  See application file for complete search history.

(56) References Cited

U.S. PATENT DOCUMENTS 5,370,751 A    12/1994 Von Hagen et al.
6,254,698 B1    7/2001 Koo et al.
(Continued)

FOREIGN PATENT DOCUMENTS

CA       2835533 A1    11/2012
CN    101041881 A    9/2007
(Continued)

OTHER PUBLICATIONS

Mori et al. Warm and Hot Stamping of Ultra High Tensile Strength Steel Sheets Using Resistance Heating. CIRP Annals. vol. 54, Issue 1, 2005, pp. 209-212 (Year: 2005).*

(Continued)

*Primary Examiner* — Jophy S. Koshy
*Assistant Examiner* — Joshua S Carpenter
(74) *Attorney, Agent, or Firm* — Davidson Kappel LLC

(57) ABSTRACT

A method for manufacturing a steel product includes providing a heated steel starting product at a temperature between 380° C. and 700° C., with a composition comprising, in percent by weight: 0.15%≤C≤0.40%, 1.5%≤Mn≤4.0%, 0.5%≤Si≤2.5%, 0.005%≤Al≤1.5%, with 0.8%≤Si+Al≤2.5%, S≤0.05%, P≤0.1%, at least one element chosen among Cr and Mo; subjecting the starting product to a hot forming step at a temperature between 700° C. and 380° C., to obtain a fully austenitic product; then quenching the product by cooling it down, to a quenching temperature QT lower than Ms in order to obtain a structure containing between 40% and 90% of martensite; then maintaining or reheating the product to a holding temperature PT between QT and 470° C. and holding the temperature PT for a duration Pt between 5 s and 600 s.

12 Claims, 3 Drawing Sheets

(51) Int. Cl.

| | | |
|---|---|---|
| *C21D 7/13* | (2006.01) | |
| *C21D 9/46* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *C22C 38/12* | (2006.01) | |
| *C22C 38/14* | (2006.01) | |
| *C22C 38/26* | (2006.01) | |
| *C22C 38/28* | (2006.01) | |
| *C22C 38/32* | (2006.01) | |
| *C22C 38/34* | (2006.01) | |
| *C22C 38/38* | (2006.01) | |
| *C23C 2/06* | (2006.01) | |
| *C23C 2/12* | (2006.01) | |
| *C23C 2/28* | (2006.01) | |

(52) U.S. Cl.
CPC ......... *C21D 8/0226* (2013.01); *C21D 8/0263* (2013.01); *C21D 9/46* (2013.01); *C22C 38/001* (2013.01); *C22C 38/002* (2013.01); *C22C 38/02* (2013.01); *C22C 38/04* (2013.01); *C22C 38/06* (2013.01); *C22C 38/12* (2013.01); *C22C 38/14* (2013.01); *C22C 38/26* (2013.01); *C22C 38/28* (2013.01); *C22C 38/32* (2013.01); *C22C 38/34* (2013.01); *C22C 38/38* (2013.01); *C23C 2/06* (2013.01); *C23C 2/12* (2013.01); *C23C 2/28* (2013.01); *C23C 2/29* (2022.08); *C21D 2211/001* (2013.01); *C21D 2211/008* (2013.01)

(56) References Cited

U.S. PATENT DOCUMENTS

| | | | |
|---|---|---|---|
| 6,582,528 B1 | 6/2003 | Boehm et al. | |
| 6,773,514 B1 | 8/2004 | Kawalla et al. | |
| 8,066,829 B2 | 11/2011 | Spehner | |
| 9,644,247 B2 | 5/2017 | Matsuda et al. | |
| 2007/0068607 A1 | 3/2007 | Huff | |
| 2009/0223609 A1 | 9/2009 | Hakomori et al. | |
| 2011/0165436 A1 | 7/2011 | Drillet et al. | |
| 2013/0295402 A1 | 11/2013 | Oh et al. | |
| 2014/0076470 A1 | 3/2014 | Zhu et al. | |
| 2014/0299237 A1 | 10/2014 | Somani | |
| 2014/0322559 A1* | 10/2014 | Becker | C22C 38/12 148/333 |
| 2015/0354035 A1 | 12/2015 | Mizuta | |
| 2016/0017452 A1 | 1/2016 | Puerta Velasquez et al. | |

FOREIGN PATENT DOCUMENTS

| | | |
|---|---|---|
| CN | 101300365 A | 11/2008 |
| CN | 101319295 A | 12/2008 |
| CN | 102080192 A | 6/2011 |
| CN | 102943169 A | 2/2013 |
| CN | 104630647 A | 5/2015 |
| CN | 104674119 A | 6/2015 |
| EP | 576107 B1 | 6/1995 |
| EP | 1939308 A1 | 7/2008 |
| EP | 2602335 | 6/2013 |
| EP | 2660345 A2 | 11/2013 |
| JP | H09111408 A | 4/1997 |
| JP | H10306317 A | 11/1998 |
| JP | 2002146493 | 5/2002 |
| JP | 2006219692 | 8/2006 |
| JP | 2008127612 | 6/2008 |
| JP | 201184758 A | 9/2011 |
| JP | 2013001837 | 1/2013 |
| JP | 2014508854 A | 4/2014 |
| JP | 2014518945 A | 8/2014 |
| RU | 2235792 C2 | 9/2004 |
| RU | 2395593 C1 | 7/2010 |
| RU | 2499847 C2 | 11/2013 |
| WO | WO0065103 | 11/2000 |
| WO | WO0102610 | 1/2001 |
| WO | WO2012153008 A1 | 11/2012 |
| WO | WO2014037627 A1 | 3/2014 |

OTHER PUBLICATIONS

Ostwald t al: Manufacturing Processes and System ($9^{th}$ Edition), Chapters 14 and 15—John Wiley & Sons (1997).

* cited by examiner

⊢ 1μm

METHOD FOR MANUFACTURING A HIGH STRENGTH STEEL PRODUCT AND STEEL PRODUCT THEREBY OBTAINED

This is a divisional of U.S. application Ser. No. 15/526, 902 which has a filing date of May 15, 2017 and which is a national stage of PCT/IB2015/058887 filed Nov. 17, 2015 which claims priority to PCT/IB2014/066128 filed Nov. 18, 2014, the entire disclosures of which are hereby incorporated by reference herein.

The present disclosure relates to a method for manufacturing a high strength steel product and to a high strength steel product obtained by this method.

More specifically, the present disclosure relates to a method for manufacturing a steel product, for example a steel sheet or a steel part, combining good elongation properties and a high tensile strength.

BACKGROUND

High strength steel sheets made of DP (Dual Phase) steels or TRIP (TRansformation Induced Plasticity) steels are currently used to manufacture various parts in the automotive industry, in cars and trucks.

In order to reduce the weight of the equipments made of these steels, it is very desirable to increase the tensile strength and the yield strength without decreasing the elongation which is necessary to have a good workability and without reducing the weldability.

For this purpose, it was proposed in WO 2012/153008 to use CMnSi steels containing 0.15% to 0.4% C, 1.5% to 3% Mn, and 0.005% to 2% Si, such steels being heat treated in order to have a totally martensitic structure.

WO 2012/153008 thus discloses a method for fabricating a steel sheet or part wherein the steel is heated at a temperature between 1050° C. and 1250° C., then subjected to a rough rolling at a temperature between 1150° C. and 900° C., thereafter cooled to a temperature between 380° C. and 600° C., subjected to a final hot rolling at this temperature, and subsequently directly quenched to ambient temperature.

This fabrication method allows obtaining a steel sheet or part with a tensile strength higher than the tensile strength of steel sheets that are manufactured by austenitizing the steel and then quenching to obtain a full martensitic hardening.

However, even though this method does not impair the elongation properties of the steel, it does not either improve these properties. The total elongation TE of the steel sheets obtained by such method is generally limited to less than 7% for a tensile strength of about 1600 MPa.

SUMMARY

So, it remains desirable to be able to produce a steel sheet or part having a yield strength YS of more than 1000 MPa up to 1700 MPa, a tensile strength TS of more than 1300 MPa, up to 2000 MPa, a uniform elongation UE of more than 7%, a total elongation TE of more than 10%, a product tensile strength×total elongation (TS×TE) higher than 18000 MPa % and a product tensile strength×uniform elongation (TS×UE) higher than 13000 MPa %. These properties are measured according to ISO standard ISO 6892-1, published in October 2009. It must be emphasized that, due to differences in the methods of measure, in particular due to differences in the size of the specimen used, the values of the total elongation according to the ISO standard are very different, in particular lower, than the values of the total elongation according to the JIS Z 2201-05 standard.

For this purpose the present disclosure provides a method for manufacturing a steel product, comprising the successive steps of:

providing a heated steel starting product at a temperature comprised between 380° C. and 700° C., said heated steel starting product having a metastable fully austenitic structure, said heated steel starting product having a composition comprising, in percent by weight:

$0.15\% \leq C \leq 0.40\%$, $1.5\% \leq Mn \leq 4.0\%$, $0.5\% \leq Si \leq 2.5\%$, $0.005\% \leq Al \leq 1.5\%$, with $0.8\% \leq Si+Al \leq 2.5\%$, $S \leq 0.05\%$, $P \leq 0.1\%$, at least one element chosen among Cr and Mo, such that:

$0\% \leq Cr \leq 4.0\%$, $0\% \leq Mo \leq 0.5\%$, and $2.7\% \leq Mn+Cr+3\ Mo \leq 5.7\%$, and optionally one or several elements chosen among:

$Nb \leq 0.1\%$, $Ti \leq 0.1\%$, $Ni \leq 3.0\%$, $0.0005\% \leq B \leq 0.005\%$, $0.0005\% \leq Ca \leq 0.005\%$, the balance of the composition consisting of iron and unavoidable impurities resulting from the smelting, subjecting said heated steel starting product to a hot forming step at a temperature comprised between 700° C. and 380° C., with a cumulated strain $\varepsilon_h$ between 0.1 and 0.7, in at least one location of said heated steel starting product, to obtain a hot-formed steel product, the structure of the steel remaining fully austenitic, then quenching the hot-formed steel product by cooling it down, at a cooling rate $VR_2$ superior to the critical martensitic cooling rate, to a quenching temperature QT lower than the martensite start temperature Ms of the steel in order to obtain a structure containing between 40% and 90% of martensite, the rest of the structure being austenite, then maintaining at, or reheating the product up to a holding temperature PT between QT and 470° C. and holding it at said temperature PT for a duration Pt between 5 s and 600 s.

According to other advantageous aspects of the present disclosure, the method comprises one or more of the following features, considered alone or according to any technically possible combination:

the method further comprises a step of cooling the held product down to ambient temperature at a cooling rate greater than 0.005° C./s so as to obtain fresh martensite;
the heated steel starting product is a hot rolled steel sheet and the steel product is a steel sheet, and wherein said hot forming step is a rolling step;
the step of providing a heated steel starting product comprises:
heating a steel semi-product, with a composition according to claim 1, to a temperature higher than the temperature $AC_3$ of the steel so as to obtain a fully austenitic structure,
subjecting said steel semi-product to a rough rolling step at a temperature above a temperature $T_2$ between 120° and 850° C., with a cumulated reduction strain $\varepsilon_a$ greater than 1, so as to obtain said heated steel starting product;
said heated steel starting product has an average austenitic grain size of less than 30 µm;
the starting product is a steel blank, the steel product is a steel part, and the step of providing a heated steel starting product comprises heating said steel blank to a temperature higher than the temperature $AC_3$ of the steel so as to obtain a fully austenitic structure;
said steel blank has a thickness between 1.0 mm and 4.0 mm;
said hot forming step is a hot rolling step;
said hot forming step is a hot stamping step;
said hot forming step is a hot spinning step;
said hot forming step is a roll forming step;
said steel blank comprises at least one coating layer;
a coating layer is applied on said starting product before heating, and the coating layer is aluminum or aluminum based coating, or zinc or zinc-based coating.

The present disclosure also provides a steel product having a composition comprising, in percent by weight:

$0.15\% \leq C \leq 0.40\%$, $1.5\% \leq Mn \leq 4.0\%$, $0.5\% \leq Si \leq 2.5\%$, $0.005\% \leq Al \leq 1.5\%$, with $0.8\% \leq Si+Al \leq 2.5\%$, $S \leq 0.05\%$, $P \leq 0.1\%$, at least one element chosen among Cr and Mo, such that:

$0\% \leq Cr \leq 4.0\%$, $0\% \leq Mo \leq 0.5\%$, and $2.7\% \leq Mn+Cr+3 Mo \leq 5.7\%$, and optionally one or several elements chosen among $Nb \leq 0.1\%$ $Ti \leq 0.1\%$, $Ni \leq 3.0\%$ $0.0005\% \leq B \leq 0.005\%$ $0.0005\% \leq Ca \leq 0.005\%$, the balance of the composition consisting of iron and unavoidable impurities resulting from the smelting,
the structure of at least one location of the steel product consisting of:
tempered martensite or laths of martensite without carbides, with a surface percentage of at least 40%,
fresh martensite, in the shape of islands or films, the surface percentage of said fresh martensite being comprised between 5% and 30%, and
austenite, with a surface percentage from 5% to 35%.

According to other advantageous aspects of the present disclosure, the steel product comprises one or more of the following features, considered alone or according to any technically possible combination:
the product of the tensile strength TS of the steel by the uniform elongation UE of the steel is greater than or equal to 13000 MPa %;
the martensite laths have an average size of less than 1 µm, the aspect ratio of said martensite laths being comprised between 2 and 5;
the maximal size of the islands of said fresh martensite with an aspect ratio inferior to 3, is inferior to 3 µm;
the average size of the prior austenitic grain is lower than 30 µm;
the aspect ratio of the prior austenitic grain is higher than 1.3;
said austenite is in the shape of films or islands, the smallest dimension of said films or islands having a value inferior to 0.3 µm, the largest dimension of said films or islands having an average value inferior to 2 µm;
said tempered martensite comprises, in surface percentage, less than 0.5% of carbides, as compared to the surface of said tempered martensite, and said carbides have an average size lower than 50 nm;
said steel product is a steel sheet, and the structure of the whole steel sheet consists of:
tempered martensite or laths of martensite without carbides, with a surface percentage of at least 40%,
fresh martensite, in the shape of islands or films, the surface percentage of said fresh martensite being comprised between 5% and 30%, and
austenite, with a surface percentage from 5% to 35%;
said steel product is a hot stamped steel part, and the structure of at least 20% of the volume of said hot-stamped part consists of:
tempered martensite or laths of martensite without carbides, with a surface percentage of at least 40%,
fresh martensite, in the shape of islands or films, the surface percentage of said fresh martensite being comprised between 5% and 30%, and
austenite, with a surface percentage from 5% to 35%;
said steel product comprises at least one coating layer;
said at least one coating layer is zinc or zinc-based alloy, or aluminum or aluminum based alloy;
said at least one coating layer is applied before hot stamping.

BRIEF SUMMARY OF THE DRAWINGS

The present disclosure will now be described in details without introducing limitations and illustrated by examples and the annexed figures among which.

DETAILED DESCRIPTION

Figure 1:
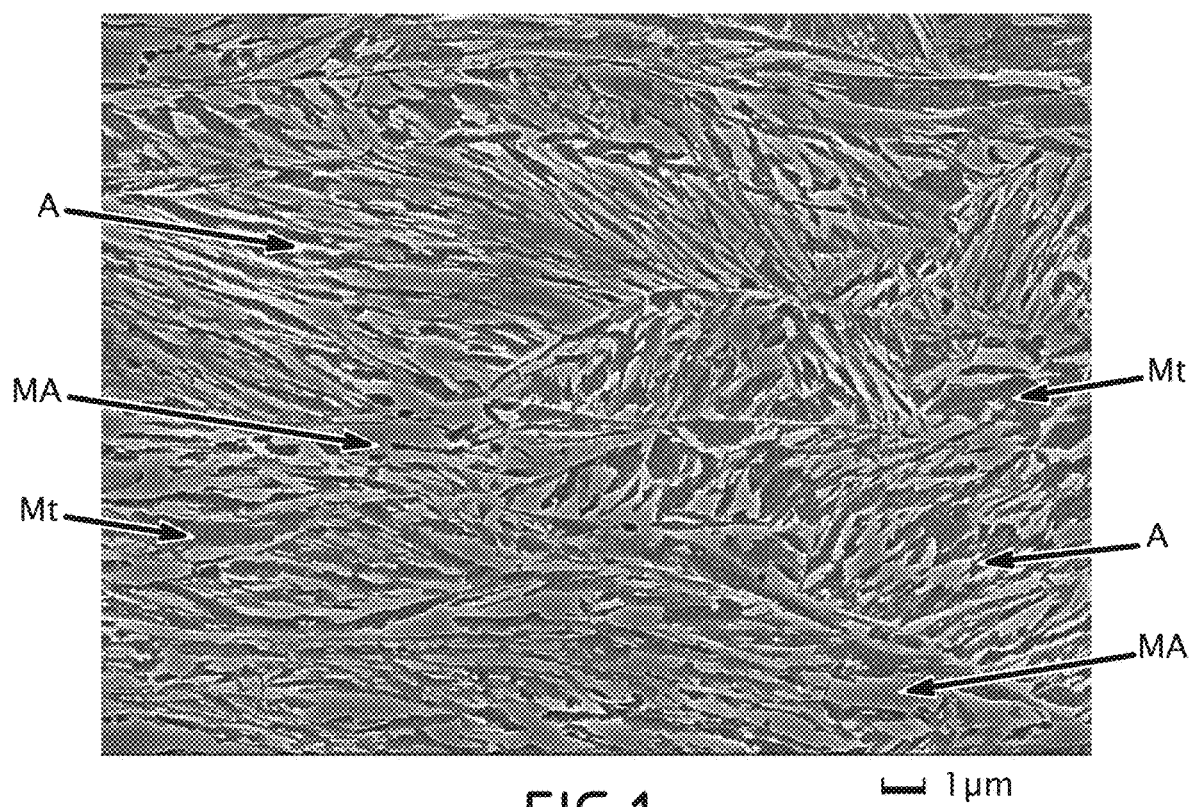
FIG. 1 is a Scanning Electron Micrograph (SEM) illustrating the microstructure of a steel product according to the present disclosure.

The steel product according to the present disclosure has the following composition:

0.15%≤C≤0.40% for ensuring a satisfactory strength and improving the stability of the retained austenite. In particular, with a carbon content lower than 0.15%, the quenchability of the steel is not good enough, which does not allow the formation of enough martensite with the manufacturing method used. With a content in C greater than 0.40%, the weldability of the steel is reduced. Indeed, the welded joints produced from the sheets would have an insufficient toughness. Preferably, the carbon content is higher than or equal to 0.25%. Preferably, the carbon content is not higher than 0.33%.

1.5%≤Mn≤4.0%. The manganese lowers $Ac_1$, $Ac_3$, and Ms temperatures, i.e. respectively the temperature at which the austenite begins to form on heating ($Ac_1$), the temperature at which the austenite transformation is completed on heating ($Ac_3$), and the temperature at which transformation from austenite to martensite starts on cooling (Ms). Thus, Mn improves the stability of the retained austenite by higher chemical enrichment of austenite in Mn and by decreasing the grain size of the austenite. The austenite grain size refinement leads to a decrease in the diffusion distance and therefore fastens the C and Mn diffusion during a temperature holding step which can be performed during the cooling cycle of the heat treatment. In order to obtain a stabilizing effect sufficient to allow the deformation of the steel in the temperature range of 700 to 380° C. during cooling, the Mn content must not be less than 1.5%. Besides, when the content in Mn is greater than 4%, segregated zones appear, which are detrimental for the stretch flangeability and impair the implementation of the present disclosure. Preferably, the Mn content is higher than 1.8%. Preferably, the Mn content is not higher than 2.5%.

0.5%≤Si≤2.5% and 0.005%≤Al≤1.5%, the silicon and aluminum contents further satisfying the following relationship: 0.8%≤Si+Al≤2.5%. According to the present disclosure Si and Al together play an important role:

Silicon delays the precipitation of cementite upon cooling down below the equilibrium transformation temperature $Ae_3$. Therefore, a Si addition helps to stabilize a sufficient amount of residual austenite in the form of islands. Si further provides solid solution strengthening and retards the formation of carbides during carbon redistribution from martensite to austenite resulting from an immediate reheating and holding step performed after a partial martensitic transformation. At a too high content, silicon oxides form at the surface, which impairs the coatability of the steel. Therefore, the Si content is preferably less than or equal to 2.5%.

Aluminum is a very effective element for deoxidizing the steel in the liquid phase during elaboration. The Al content is not less than 0.005% in order to obtain a sufficient deoxidization of the steel in the liquid state. Furthermore, like Si, Al stabilizes the residual austenite. The Al content is not higher than 1.5% in order to avoid the occurrence of inclusions, to avoid oxidation problems and to ensure the hardenability of the material.

The effects of Si and Al on the stabilization of the austenite are similar. When the Si and Al contents are such that 0.8%≤Si+Al≤2.5%, satisfactory stabilization of the austenite is obtained, thereby making it possible to form the desired microstructures.

Sulfur and phosphorus have to be maintained at low levels, i.e. S≤0.05% and P≤0.1%, in order not to deteriorate too much the ductility and the toughness of the parts. As achievement of extremely low sulfur is costly, a sulfur content higher than 0.0005% is preferable for economic reasons. In a similar manner, a phosphorus content higher than 0.0005% is preferable.

The steel according to the present disclosure contains at least one element chosen among molybdenum and chromium. Cr and Mo are very efficient to delay the transformation of austenite and prevent the formation of proeutectoid ferrite or bainite, and can be used to implement the present disclosure. In particular, these elements have an influence on the isothermal transformation diagram on cooling (also known as Time-Temperature-Transformation (TTT) diagram): additions of Cr and Mo separate the ferrite-pearlite transformation domain, from the bainite transformation domain, the ferrite-pearlite transformation occurring at higher temperatures than the bainite transformation. Thus, these transformation domains appear as two distinct "noses" in the TTT diagram, which opens a "bay" allowing deforming the steel upon cooling between these two noses, without causing undesirable transformation from austenite into ferrite, pearlite and/or bainite. For the compositions of the present disclosure, this temperature range for deformation is comprised between 380 and 700° C. Hot forming of metastable austenite in this range is known as "ausforming".

If the composition of the steel comprises Cr, the Cr content must not be higher than 4.0%. Indeed, above this value, the effect of Cr is saturated and increasing its content would be costly, without providing any beneficial effect.

If the composition of the steel comprises Mo, the Mo content is not higher than 0.5%, owing to its high cost.

Furthermore, according to the present disclosure, the Mn, Cr and Mo contents are such that 2.7%≤Mn+Cr+3 Mo≤5.7%. The Mn, Cr and Mo factors in this relationship reflect their respective capabilities to prevent the transformation of austenite and to provide hardening for obtaining sufficient mechanical properties.

The steel according to the present disclosure optionally contains niobium and/or titanium.

When Nb is present in the composition, the content in Nb should not be higher than 0.1%, and preferably higher than 0.025%. When Ti is present in the composition, the content in Ti should not be higher than 0.1%, and preferably higher than 0.01%.

In these amounts, Nb has a strong synergy effect with B to improve the hardenability of the steel, and Ti can protect B against the formation of BN. Moreover, the addition of Nb and Ti can increase the resistance to the softening of martensite during tempering.

This effect of Nb and Ti appear noticeably with contents in Nb and Ti respectively higher than 0.025% and 0.01%.

The Nb and Ti contents are each not higher than 0.1% in order to limit the hardening of the steel at high temperatures provided by these elements, which would make it difficult to produce thin plates due to increase of hot rolling forces.

Optionally, the composition may comprise nickel, in an amount lower than or equal to 3.0%, and preferably higher than 0.001%.

The steel may optionally contain boron in an amount comprised between 0.0005% and 0.005%, in order to increase the quenchability of the steel. Indeed, an important deformation of the austenite could result in the accelerated transformation of the austenite to ferrite during the cooling. An addition of B, in an amount comprised between 0.0005% and 0.005%, helps preventing this early ferritic transformation.

Optionally, the steel may comprise calcium in an amount comprised between 0.0005% and 0.005%: by combining with O and S, Ca helps avoiding the formation of large-sized inclusions which impact negatively the ductility of the sheets.

The remainder of the composition of the steel is iron and impurities resulting from the smelting. The impurities may include nitrogen, the N content being not higher than 0.010%.

The method for manufacturing a steel product according to the present disclosure aims at manufacturing a steel product having, in at least one location of the product, a microstructure consisting of tempered martensite or laths of martensite without carbides, with a surface percentage of at least 40%, fresh martensite, present as islands or films, the surface percentage of said fresh martensite being comprised between 5% and 30%, and retained austenite with a surface percentage from 5% to 35%.

These microstructural features can be present in the totality of the product, or only in some locations, so as to withstand locally stringent stresses. In the latter case, these microstructural features must be present in at least 20% of the volume of the product, so as to obtain significant strength resistance.

The manufacturing method will be now described. The method comprises a step of providing a heated steel starting product, at a temperature comprised between 380° C. and 700° C., said heated steel starting product having a fully austenitic structure. Referring to this temperature range and to the steel composition below, it is understood that this austenitic structure is in a metastable state, i.e. that this heated steel starting product is obtained from a heating step in the austenitic range, followed by cooling at a speed that is sufficiently high so that the austenite does not have time to transform.

Said heated starting product further has a composition comprising, in percent by weight:

0.15%≤C≤0.40%, 1.5%≤Mn≤4.0%, 0.5%≤Si≤2.5%, 0.005%≤Al≤1.5%, with 0.8%≤Si+Al≤2.5%,

S≤0.05%,

P≤0.1%, at least one element chosen among Cr and Mo, such that:

0%≤Cr≤4%,

0%≤Mo≤2%, and 2.7%≤Mn+Cr+3 Mo≤5.7%, and optionally one or several elements chosen among:

Nb≤0.1%,

Ni≤3.0%,

Ti≤0.1%, 0.0005%≤B≤0.005%, 0.0005%≤Ca≤0.005%, the balance of the composition consisting of iron and unavoidable impurities resulting from the smelting.

Said heated starting product is for example a semi-product or a blank.

A semi-product is defined as a sheet which has been subjected to a hot-rolling step, but which thickness is higher at this stage, than the desired final thickness.

A blank is defined as the result of cutting a steel sheet or coil to a form related to the desired final geometry of the product to be produced.

According to the present disclosure, the heated starting product is subjected, in at least one location of the starting product, to a hot forming step, at a temperature comprised between 700° C. and 380° C., with a cumulated strain between 0.1 and 0.7, the structure of the steel remaining fully austenitic, i.e. ausforming is performed.

The hot forming step may be performed in one or several successive stages. Since the deformation modes may differ from one location of the product to another because of the geometry of the product and the local stresses modes, an equivalent cumulated strain $\varepsilon_b$ is defined at each place in the product as $$\varepsilon_b = \frac{2}{\sqrt{3}}\sqrt{\varepsilon_1^2 + \varepsilon_1\varepsilon_2 + \varepsilon_2^2},$$

in which $\varepsilon_1$ and $\varepsilon_2$ are the principal strains cumulated on all the stages of deformation.

If the hot forming is performed through hot rolling, the cumulated strain $\varepsilon_b$ is defined from the initial sheet thickness $t_i$ before hot rolling, and the final sheet thickness $t_f$ after hot rolling, by:

$$\varepsilon_b = \ln\left(\frac{t_i}{t_f}\right).$$

In these conditions, a plastically deformed austenite structure, wherein recrystallization does not occur, is obtained.

The hot forming step is carried out between temperatures $T_3$ and $T_3'$ both comprised between 380° C. and 700° C., for example between 550° C. and 450° C., in order to allow austenite refinement, to avoid recrystallization of the deformed austenite, and to avoid transformation of the austenite during the hot forming step. In particular, owing to the composition of the steel, the formation of ferrite, pearlite and/or bainite during this hot forming step is avoided.

Indeed, as disclosed above, the Mn improves the stability of the retained austenite.

Moreover, Cr and Mo delay the transformation of austenite and prevent the formation of proeutectoid ferrite or bainite, by separating the ferrite-pearlite transformation domain from the bainite transformation domain. These transformation domains thus appear as two distinct "noses" in an isothermal transformation diagram (also known as time-temperature-transformation (TTT) diagram), thus opening a "window" allowing deforming the steel upon cooling between these two noses without forming ferrite, pearlite and/or bainite. Thus, the hot forming step ("aus-forming") is preferably performed at a temperature within this window.

The hot forming step leads to an increase in the tensile strength TS and the yield strength YS of the steel, as compared to a steel not subjected to such a hot forming step. In particular, the hot forming step leads to an increase $\Delta TS$ in the tensile strength of at least 150 MPa and to an increase $\Delta YS$ in the yield strength of at least 150 MPa.

At this point, the hot-formed product has a structure consisting of deformed austenite, the deformation ratio of the austenite being comprised between 0.1 and 0.7, and the average size of the austenite grains being lower than 30 µm, preferably lower than 10 µm.

According to the present disclosure, the hot-formed product is then quenched by cooling it down, at a cooling rate $VR_2$ higher than the critical martensitic cooling rate, to a quenching temperature QT lower than the martensite start temperature Ms of the steel, in order to obtain a structure containing between 40% and 90% of martensite, the remainder of the structure being austenite.

As it is desired to have a final structure containing a significant amount of retained austenite, i.e. between 5% and 35%, the temperature QT must not be too low and must be chosen according to the desired amount of retained austenite, in any case higher than the Mf transformation temperature of the steel, i.e. the temperature at which martensite transformation is complete. More specifically, it is possible to determine for each chemical composition of the steel an optimal quenching temperature QTop that achieves the desired residual austenite content. One skilled in the art knows how to determine this theoretical quenching temperature QTop.

Due to the fact that martensite transformation occurs from a deformed and finer austenite grain, the laths refinement of martensite is higher than in the previous art, as will be explained below.

For ensuring safely that the structure contains between 40% and 90% of martensite for a composition in accordance with the ranges indicated above, the quenching temperature QT is preferably below Ms-20° C., and preferably comprised between 100° C. and 350° C.

Without further cooling, the product, whose microstructure essentially consists at this moment of retained austenite and martensite, is then immediately maintained at, or reheated up to, a holding temperature PT comprised between QT and 470° C.

For example, the product is reheated to a holding temperature PT higher than Ms.

Then, the product is maintained at the temperature PT for a duration Pt, Pt being comprised between 5 s and 600 s.

During this holding step, the carbon partitions between the martensite and the austenite, i.e. diffuses from the martensite to the austenite, which leads to an improvement of the ductility of the martensite and to an increase in the carbon content of the austenite without apparition of significant amount of bainite and/or of carbides. The enriched austenite makes it possible to obtain a TRIP ("Transformation Induced Plasticity") effect on the final product.

The degree of partitioning increases with the duration of the holding step. Thus, the holding duration Pt is chosen sufficiently long to provide as complete as possible partitioning. The holding duration Pt must be greater than 5 s, and preferably greater than 20 s, in order to optimize the enrichment of the austenite in carbon.

However, a too long duration can cause the austenite decomposition and too high partitioning of martensite and, hence, a reduction in mechanical properties. Thus, the duration is limited so as to avoid as much as possible the formation of ferrite. Therefore, the holding duration Pt should be less than 600 s. The product is finally cooled down to ambient temperature at a cooling rate required to create from 5% to 30% of fresh martensite, and to have a surface percentage of retained austenite from 5% to 35%. Preferably the cooling rate should be greater than 0.005° C./s.

The quenching and holding steps are defined as a "quenching and partitioning" ("Q-P") step.

The steel product thus obtained is characterized, in the location subjected to the hot forming step, by a microstructure consisting of tempered martensite or laths of martensite without carbides, with a surface percentage of at least 40%, fresh martensite, in the shape of islands or films, the surface percentage of said fresh martensite being comprised between 5% and 30%, and retained austenite, with a surface percentage from 5% to 35%.

The martensite laths are very thin. Preferably, these martensite laths, as characterized by EBSD, have an average size of at most 1 µm.

Furthermore, the average aspect ratio of these martensite laths is preferably comprised between 2 and 5.

These features are for example determined by observing the microstructure with a Scanning Electron Microscope with a Field Emission Gun ("FEG-SEM") at a magnification greater than 1200×, coupled to an Electron Backscatter Diffraction ("EBSD") device. Two contiguous laths are defined as distinct laths when their disorientation is at least 5°. The morphology of the individualized laths is then determined by image analysis with conventional software known of one skilled in the art. The largest dimension $l_{max}$, the smallest dimension $l_{min}$ and the aspect ratio $$\frac{l_{max}}{l_{min}}$$

of each lath are thus determined. This determination is carried out on a sample of at least 1000 laths. The average aspect ratio $$\overline{\frac{l_{max}}{l_{min}}},$$

which is then determined for this sample, is preferably comprised between 2 and 5.

The tempered martensite and laths of martensite comprise less than 0.5% of carbides in surface percentage as compared to the surface of said tempered martensite and laths. These carbides have an average size lower than 50 nm.

The highest dimension of the islands of fresh martensite with an aspect ratio inferior to 3, is inferior to 3 µm.

Retained austenite is necessary particularly to enhance ductility. As seen above, the retained austenite is deformed, with a deformation ratio comprised between 0.1 and 0.7.

Preferably, the retained austenite is in the shape of films or islands. The smallest dimension of these films or islands has a value inferior to 0.3 µm and the largest dimension of these films or islands has an average value inferior to 2 µm. The refinement of the retained austenite improves its stability, such that during straining, the retained austenite transforms into martensite over a large range of strain. The retained austenite is also stabilized by carbon partitioning from martensite to austenite.

The average size of the prior austenitic grain, which is the average size of the austenite just before its transformation upon cooling, i.e. in the present case, the average size of the austenite further to the hot forming step, is lower than 30 µm, preferably lower than 10 µm. Furthermore, the aspect ratio of the prior austenitic grain is higher than 1.3.

To determine this aspect ratio, the prior austenitic grains are revealed on the final product by a suitable method, known to one skilled in the art, for example by etching with a picric acid etching reagent. The prior austenitic grains are observed under an optical microscope or a scanning electron microscope. The aspect ratio of the prior austenitic grains is then determined by image analysis with conventional software known of one skilled in the art. On a sample of at least 300 grains, the largest dimension and the smallest dimension of the prior austenitic grains are determined, and the aspect ratio of the grains is determined as the ratio between the largest dimension and the smallest dimension. The aspect ratio which is then determined, as the average of the values obtained over the samples, is higher than 1.3.

With this manufacturing method, it is possible to obtain a high strength steel product having a yield strength YS of more than 1000 MPa up to 1700 MPa and a tensile strength TS of more than 1300 MPa up to 2000 MPa, together with a uniform elongation UE of at least 7% and a total elongation TE of at least 10%, the product TS×TE being higher than 18000 MPa % and the product TS×UE being higher than 13000 MPa %.

Indeed, even if the quenching to temperature QT, followed by the holding step at the temperature PT, results in a decrease in the surface percentage of martensite in the microstructure of the steel, which could lead to a decrease in the tensile strength TS, this treatment increases the ductility of the martensite through structure refinement, ensures the absence of carbide precipitates and leads to the formation of austenite enriched in carbon, so that this treatment results in an increase of the yield strength YS, of the tensile strength TS, and of the uniform and total elongations.

According to a first embodiment of the present disclosure, the manufacturing method is performed to manufacture a steel sheet.

According to this first embodiment, the heated starting product is a hot rolled steel sheet with a composition according to the present disclosure, and the hot forming step is a hot rolling step.

The step of providing a heated starting product with a fully austenitic structure comprises providing a semi-product with a composition according to the present disclosure, heating the semi-product to a temperature $T_1$ higher than the temperature $AC_3$ of the steel so as to obtain a fully austenitic structure, and subjecting the semi-product to a rough rolling step, with a cumulated reduction strain $\varepsilon_a$ greater than 1, so as to obtain said hot rolled steel sheet.

The semi-product is obtained by casting a steel with a composition according to the present disclosure. The casting may be carried out in the form of ingots or of continuously cast slabs, with a thickness around 200 mm. The casting may also be carried out to so as to obtain thin slabs with a thickness of a few tens of millimeters, for example of between 50 mm and 80 mm.

The semi-product is subjected to a full austenization by heating to a temperature $T_1$ comprised between 1050 and 1250° C., for a duration $t_1$ sufficient so as to to allow a complete austenization. Temperature $T_1$ is thus above the temperature $AC_3$ at which transformation of ferrite into austenite is completed upon heating. This heating thus results in a complete austenization of the steel and in the dissolution of Nb carbonitrides which may be present in the starting product. Moreover, temperature $T_1$ is high enough to allow performing a subsequent rough rolling step above $A_{r3}$.

The semi-product is then subjected to a rough rolling at temperature comprised between 1200° C. and 850° C., with a finish rolling temperature $T_2$ above $A_{r3}$, so that the steel structure remains fully austenitic at that stage.

The cumulated strain $\varepsilon_a$ of the rough rolling is greater than 1. Designating by $t_i$ the thickness of the semi product before the rough rolling, and by $t_f$ the thickness of the semi product after the completion of rough rolling, $\varepsilon_a$ is calculated through:

$$\varepsilon_a = \ln\left(\frac{t_i}{t_f}\right).$$

The average austenitic grain size thus obtained is less than 30 µm. At this stage, this average austenitic grain size can be measured by trials wherein the steel specimen is directly quenched after the rough rolling step. The sample is then cut along a direction parallel to a rolling direction to obtain a cut surface. The cut surface is polished and etched with a reagent known of one skilled in the art, for example a Béchet-Beaujard reagent, which reveals the former austenitic grain boundaries.

The hot rolled sheet is then cooled down to a temperature $T_3$ comprised between 380° C. and 700° C., at a cooling rate $VR_1$ greater than 2° C./s, in order to avoid austenite transformation.

The hot rolled sheet is then subjected to a final hot rolling step with a cumulated reduction strain $\varepsilon_b$, comprised between 0.1 and 0.7. The final hot rolling is performed in the temperature range between 380° C. and 700° C.

The hot rolled steel sheet thus obtained has a structure which still consists of austenite, with an austenitic grain size inferior to 30 µm, preferably inferior to 10 µm. Thus, the hot rolled sheet is submitted to ausforming.

The hot rolled steel sheet is then cooled at a cooling rate $VR_2$ greater than the critical martensitic cooling rate, down to a quenching temperature QT so as to obtain a surface percentage of martensite comprised between 40% and 90%, the rest being untransformed austenite. The temperature QT is preferably below Ms-20° C. and above Mf, for example comprised between 100° C. and 350° C. Without further cooling, the sheet is then immediately maintained at, or reheated from the temperature QT up to a holding temperature PT comprised between QT and 470° C., and maintained at the temperature PT for at duration Pt, Pt being comprised between 5 s and 600 s. During this holding step, the carbon partitions between the martensite and the austenite, i.e. diffuses from martensite into austenite without creating carbides. The degree of partitioning increases with the duration of the holding step. Thus, the duration is chosen to be sufficiently long to provide as complete as possible partitioning. However, a too long duration can cause the austenite decomposition and too high partitioning of martensite and, hence, a reduction in mechanical properties. Thus, the duration is limited so as to avoid as much as possible the formation of ferrite. The sheet is finally cooled down to ambient temperature at a cooling rate greater than 0.005° C./s so as to obtain from 5% to 30% of fresh martensite, and so to obtain a surface percentage of retained austenite from 5% to 35%.

According to a second embodiment of the present disclosure, the manufacturing method is performed to manufacture a steel part.

According to this second embodiment, the starting product is a steel blank with a composition according to the present disclosure.

The step of providing a heated starting product comprises providing a steel blank with a composition according to the present disclosure, and heating the steel blank to a temperature higher than the temperature $AC_3$ of the steel so as to obtain a fully austenitic structure.

The steel blank has a thickness between 1.0 mm and 4.0 mm for example.

This steel blank is obtained by cutting a steel sheet or coil to a shape related to the desired final geometry of the part to be produced.

This steel blank may be non-coated or optionally pre-coated. The pre-coating may be Aluminum or an Aluminum based alloy. In the latter case, the pre-coating may be obtained by dipping the plate in a bath of Si—Al alloy, comprising, by weight, from 5% to 11% of Si, from 2% to 4% of Fe, optionally from 15 ppm to 30 ppm of Ca, the remainder consisting of Al and impurities resulting from the smelting.

The pre-coating may also be Zinc or a Zinc-based alloy. The pre-coating may be obtained by continuous hot dip galvanizing or by galvannealing.

The steel blank is firstly heated to a temperature $T_1$ above the temperature $Ac_3$ of the steel, preferably of between 900° C. and 950° C., at a heating rate for example higher than 2° C./s, so as to obtain a fully austenitic structure. The blank is maintained at the temperature $T_1$ in order to obtain a homogeneous temperature inside the blank. Depending on the thickness of the blank, comprised between 1.0 mm and 4.0 mm, the holding time at temperature $T_1$ is from 3 minutes to 10 minutes.

This heating step, which is preferably performed in an oven, results in a complete austenization of the steel.

The heated steel blank is then extracted from the oven, transferred in a hot forming device, for example a hot stamping press, and cooled to a temperature $T_3$ comprised between 380° C. and 700° C., at a cooling rate $VR_1$ greater than 2° C./s, in order to avoid an austenite transformation.

The transfer of the blank may be carried out before or after the cooling of the blank to the temperature $T_3$. In any case, this transfer must be fast enough in order to avoid the transformation of austenite. The steel blank is then subjected to a hot forming step in the temperature range comprised between 380° C. and 700° C., for example comprised between 450° C. and 550° C., in order to allow hardening of the austenite, to avoid recrystallization of the deformed austenite, and to avoid transformation of the austenite during the hot-forming step. Thus, this hot forming step is performed through ausforming.

The deformation may be performed by methods such as hot rolling, or hot stamping in a press, roll-forming, or hot spinning.

The hot forming step may be carried out in one or several stages. The blank is deformed with a strain $\varepsilon_b$ comprised between 0.1 and 0.7 in at least one location of the blank.

According to an embodiment, the deformation mode is chosen so that the cumulated strain a is comprised between 0.1 and 0.7 in the whole blank.

Optionally, the deformation is carried out so that this condition is only satisfied in some particular locations of the blank, corresponding to the most stressed locations, wherein particularly high mechanical properties are desired. The location of the blank thus deformed represents at least 20% of the volume of the blank, so as to obtain significant mechanical properties increase in the final part.

According to this embodiment, a product with mechanical properties different from one location of the part to another is obtained.

The steel part thus obtained, in the locations subjected to the hot forming step, has a structure which consists of austenite, with an austenitic grain size inferior to 30 µm, preferably inferior to 10 µm.

The steel part thus obtained is then cooled at a cooling rate $VR_2$ superior to the critical martensitic cooling rate, to a quenching temperature QT, preferably below Ms-20° C., for example comprised between 100° C. and 350° C., in order to obtain a surface percentage of martensite comprised between 40% and 90%, the rest being austenite.

The steel part is then reheated up or maintained to a holding temperature PT comprised between QT and 470° C., and maintained at the temperature PT for a duration Pt, Pt being comprised between 5 s and 600 s.

The part is finally cooled down to ambient temperature at a cooling rate greater than 0.005° C./s so as to obtain from 5% to 30% of fresh martensite and so as to have from 5% to 35% of retained austenite.

By way of example and comparison, sheets made of steels having the compositions which are reported in table I were produced by various manufacturing methods.

EXAMPLES

TABLE I

Steel compositions

| Composition reference | C (%) | Mn (%) | Cr (%) | Mo (%) | Mn + Cr + 3Mo (%) | Si (%) | Al (%) | Si + Al (%) | P (%) | S (%) | N (%) | Ti (%) | Nb (%) | B (%) | Ms (° C.) |
|---|---|---|---|---|---|---|---|---|---|---|---|---|---|---|---|
| 2618A | 0.200 | 2.0 | 1.02 | — | 3.03 | 1.49 | 0.026 | 1.516 | 0.014 | 0.020 | 0.004 | 0.013 | 0.026 | 0.0015 | 336 |
| 2618B | 0.251 | 2.0 | 1.02 | — | 3.03 | 1.5 | 0.021 | 1.521 | 0.014 | 0.020 | 0.004 | 0.013 | 0.027 | 0.0015 | 313 |
| 2618C | 0.247 | 2.0 | 1.01 | — | 3.01 | 1.48 | 0.021 | 1.501 | 0.014 | 0.020 | 0.004 | 0.013 | 0.026 | 0.0014 | 316 |
| 2618D | 0.305 | 2.0 | 1.01 | — | 3.01 | 1.5 | 0.018 | 1.518 | 0.014 | 0.020 | 0.004 | 0.013 | 0.026 | 0.0015 | 292 |
| 2623A | 0.198 | 2.0 | — | 0.149 | 2.45 | 1.5 | 0.022 | 1.522 | 0.016 | 0.020 | 0.003 | 0.013 | 0.019 | 0.0017 | 346 |

TABLE I-continued

Steel compositions

| Composition reference | C (%) | Mn (%) | Cr (%) | Mo (%) | Mn + Cr + 3Mo (%) | Si (%) | Al (%) | Si + Al (%) | P (%) | S (%) | N (%) | Ti (%) | Nb (%) | B (%) | Ms (° C.) |
|---|---|---|---|---|---|---|---|---|---|---|---|---|---|---|---|
| 2623B | 0.195 | 3.0 | — | 0.148 | 3.44 | 1.48 | 0.019 | 1.499 | 0.017 | 0.020 | 0.003 | 0.013 | 0.019 | 0.0018 | 313 |
| 2623C | 0.307 | 3.0 | — | 0.146 | 3.44 | 1.49 | 0.018 | 1.508 | 0.017 | 0.020 | 0.003 | 0.013 | 0.019 | 0.0019 | 265 |
| 2623D | 0.307 | 2.44 | — | 0.146 | 2.88 | 1.48 | 0.018 | 1.498 | 0.017 | 0.020 | 0.003 | 0.013 | 0.024 | 0.0019 | 283 |
| 2293D | 0.247 | 1.95 | 1.51 | — | 3.46 | 1.55 | 0.019 | 1.574 | 0.019 | 0.020 | 0.003 | 0.014 | 0.026 | 0.0015 | 312 |

A first series of sheets (Tests 1 to 7 in Tables II and III) was produced according to the first present disclosure embodiment, by heating semi-products with the above compositions at a temperature $T_1$ for a duration $t_1$, then subjecting the heated semi-product to a rough rolling at a temperature $T_2$ between 1200° C. and 850° C., with a cumulated reduction strain of 2.

The sheets were then cooled to a temperature $T_3$, at a cooling rate $VR_1$ greater than 20° C./s, then subjected to a final hot rolling step, starting at said temperature $T_3$, and ending at a temperature $T_3'$, with a cumulated reduction strain $\varepsilon_b$.

The sheets were then cooled to a temperature QT, then immediately reheated to a holding temperature PT and maintained at temperature PT for a duration Pt (Tests 3 to 6 in Table II below).

The sheets were finally cooled down to ambient temperature at a cooling rate greater than 0.1° C./s.

A second series of sheets (Tests 8-14 in Tables II and III) was produced according to the second embodiment.

Steel blanks with the given compositions, in this case steel sheets with a thickness of 3 mm, were heated to a temperature $T_1$, at a heating rate superior to 2° C./s, and maintained at temperature $T_1$ for a duration $t_1$.

The heated steel blanks were then cooled to a temperature $T_3$ at a cooling rate $VR_1$ greater than 2° C./s, then subjected to a hot forming step, starting at said temperature $T_3$, and ending at a temperature $T_3'$, with a cumulated reduction strain $\varepsilon_b$. In the conditions of the present disclosure, the hot formed sheets were still fully austenitic after this hot forming step.

The sheets were then cooled to a temperature QT, then reheated to a holding temperature PT and maintained at temperature PT for a duration Pt.

The sheets were finally cooled down to ambient temperature at a cooling rate greater than 0.1° C./s.

For comparative purposes, a third series of sheets was manufactured by means of manufacturing processes not in accordance with the present disclosure (Tests 15 to 18 in Tables II and III).

The manufacturing methods of Tests 15 and 17 differ from the manufacturing methods used for the first and second series of examples in that they did not include a hot forming step at a temperature comprised between 700° C. and 380° C.

The manufacturing methods of Test 16 and 18 differ from the manufacturing methods used for the first and second series of examples in that the sheets were cooled down to ambient temperature immediately after the final rolling step, without any holding step, i.e. without any "quenching and partitioning" step.

The manufacturing parameters for the first, second and third series of sheets are reported in Table II, and the structures and mechanical properties obtained are reported in Table III.

TABLE II

Manufacturing conditions.

| Sheet N° | Cast | $T_1$(° C.)/$t_1$ | $T_2$ (° C.) | $T_3$ (° C.) | $T_3'$ (° C.) | $\varepsilon_b$ | QT (° C.) | Ms-20 | PT (° C.) | Pt (s) |
|---|---|---|---|---|---|---|---|---|---|---|
| 1 | 2618A | 1200/30 | 1058 | 500 | 480 | 0.42 | 305 | 316 | 410 | 160 |
| 2 | 2618B | 1200/30 | 1013 | 522 | 470 | 0.41 | 287 | 293 | 418 | 180 |
| 3 | 2618C | 1200/30 | 965 | 590 | 410 | 0.4 | 265 | 296 | 430 | 200 |
| 4 | 2618D | 1200/30 | 950 | 465 | 430 | 0.37 | 240 | 272 | 392 | 150 |
| 5 | 2623B | 1050/15 | 900 | 540 | 420 | 0.45 | 280 | 293 | 412 | 160 |
| 6 | 2623C | 1200/30 | 950 | 560 | 440 | 0.35 | 225 | 245 | 430 | 260 |
| 7 | 2293D | 1150/30 | 950 | 478 | 450 | 0.45 | 284 | 292 | 400 | 90 |
| 8 | 2618B | 850/15 | — | 500 | 410 | 0.38 | 292 | 418 | 415 | 180 |
| 9 | 2618C | 850/15 | — | 525 | 410 | 0.25 | 270 | 430 | 418 | 180 |
| 10 | 2618D | 1200/30 | — | 500 | 410 | 0.44 | 225 | 392 | 404 | 230 |
| 11 | 2623C | 950/15 | — | 540 | 460 | 0.60 | 200 | 245 | 430 | 420 |
| 12 | 2623D | 950/15 | — | 600 | 450 | 0.32 | 230 | 263 | 415 | 420 |
| 13 | 2293D | 900/10 | — | 550 | 385 | 0.35 | 236 | 292 | 370 | 90 |
| 14 | 2623A | 950/15 | — | 565 | 505 | 0.6 | 235 | 326 | 400 | 160 |
| <u>15</u> | 2618C | 950/10 | — | <u>—</u> | <u>—</u> | <u>0</u> | 275 | 296 | 410 | 160 |
| <u>16</u> | 2618C | 1150/30 | 850 | 550 | 450 | 0.45 | <u>—</u> | | <u>—</u> | <u>—</u> |
| <u>17</u> | 2623C | 950/15 | — | <u>—</u> | <u>—</u> | <u>0</u> | 200 | 245 | 430 | 420 |
| <u>18</u> | 2623C | 950/15 | — | 540 | 460 | 0.60 | <u>—</u> | | <u>—</u> | <u>—</u> |

Underlined values: out of the present disclosure

TABLE III

Mechanical properties and microstructures obtained.

| Sheet N° | Structure | Austenite fraction (%) | Presence of fresh martensite between 5 and 30% | Presence of islands of fresh martensite with a maximal size <3 μm and an aspect ratio <3 ? | YS (MPa) | TS (MPa) | UE (%) | TE (%) | TS * TE (MPa %) | TS * UE (MPa %) |
|---|---|---|---|---|---|---|---|---|---|---|
| 1 | M + A | 18.6 | Yes | Yes | 1006 | 1368 | 10.8 | 15.0 | 20525 | 14774 |
| 2 | M + A | 18.7 | Yes | Yes | 1096 | 1468 | 11.8 | 15.8 | 23145 | 17322 |
| 3 | M + A | 9 | Yes | Yes | 1218 | 1528 | 10.0 | 14.5 | 22110 | 15280 |
| 4 | M + A | 13.6 | Yes | Yes | 1296 | 1637 | 10.5 | 14.5 | 23687 | 17188 |
| 5 | M + A | 10.8 | Yes | Yes | 1147 | 1385 | 9.9 | 13.3 | 18374 | 13711 |
| 6 | M + A | 17.7 | Yes | Yes | 1004 | 1617 | 10.9 | 13.8 | 22261 | 17625 |
| 7 | M + A | 11 | Yes | Yes | 1038 | 1666 | 8.0 | 13.2 | 21991 | 13328 |
| 8 | M + A | 11.6 | Yes | Yes | 1098 | 1506 | 10.7 | 14.8 | 22344 | 16114 |
| 9 | M + A | 14.7 | Yes | Yes | 1282 | 1512 | 10.0 | 14.4 | 21722 | 15120 |
| 10 | M + A | 17.9 | Yes | Yes | 1197 | 1565 | 13.5 | 17.4 | 27144 | 21127 |
| 11 | M + A | 15.3 | Yes | Yes | 1380 | 1495 | 14.8 | 18.2 | 27259 | 22126 |
| 12 | M + A | 13.8 | Yes | Yes | 1128 | 1552 | 10.4 | 13.4 | 20849 | 16141 |
| 13 | M + A | 9.2 | Yes | Yes | 1254 | 1643 | 9.0 | 11.5 | 18836 | 14787 |
| 14 | M + A | 9.7 | Yes | Yes | 1041 | 1116 | 11.9 | 16.2 | 18085 | 13280 |
| 15 | M + A | 11 | Yes | No | 1016 | 1344 | 8.1 | 12.7 | 17109 | 10886 |
| 16 | M + A | n.d. | No | Yes | 1572 | 1986 | 3.3 | 6.5 | 12909 | 6553 |
| 17 | M + A | n.d. | Yes | No | n.d | n.d | n.d | n.d | n.d | n.d |
| 18 | M + A | 1 | No | Yes | n.d | n.d | n.d | n.d | n.d | n.d |

Underlined values: out of the present disclosure
n.d.: not determined

The microstructures of the steel according to examples 1-13 comprise more than 40% of tempered martensite or laths of ferrite without carbides, 5-30% of islands or film of fresh martensite, and austenite between 5 and 35%. The microstructures of the steel according to examples 1-13 are such that the martensite laths have an average size of less than 1 μm, and the aspect ratio of the martensite laths is comprised between 2 and 5. Furthermore, the aspect ratio of the prior austenitic grain is higher than 1.3 for examples 1-13.

These examples have a yield stress YS comprised between 1000 MPa and 1700 MPa, a tensile strength TS comprised between 1300 MPa and 2000 MPa, a uniform elongation higher than 7%, a total elongation higher than 10%, a product (tensile strength×total elongation) greater than 18000 MPa % and a product (tensile strength×uniform elongation) greater than 13000 MPa %.

Tests 11, 17 and 18 have the same composition. Test 11 was obtained by a manufacturing method according to the present disclosure, comprising both a hot forming step at a temperature comprised between 700° C. and 380° C. and a holding step, whereas Test 17 was obtained with a manufacturing method which does not comprise any hot forming step at a temperature comprised between 700° C. and 380° C., and Test 18 was obtained with a manufacturing method which does not comprise any holding step allowing carbon partitioning in martensite.

In other words:
Test 11, according to the present disclosure, comprises an ausforming and a "quenching and partitioning" step;
Test 17, not according to the present disclosure, comprises only a "quenching and partitioning" step, without ausforming;
Test 18, not according to the present disclosure, comprises only an ausforming step, without a "quenching and partitioning" step.

Figure 2:
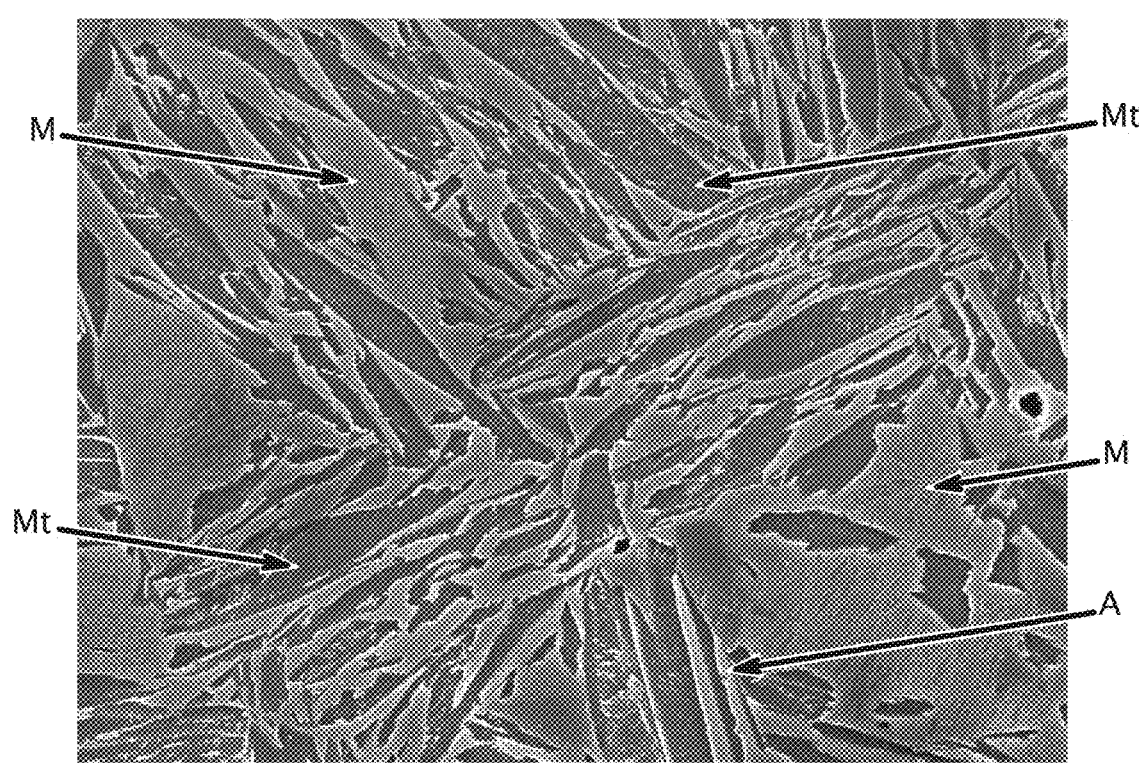
FIGS. 2 and 3 are SEM illustrating the microstructure of steel products obtained by manufacturing methods which are not in accordance with the present disclosure.
Figure 3:
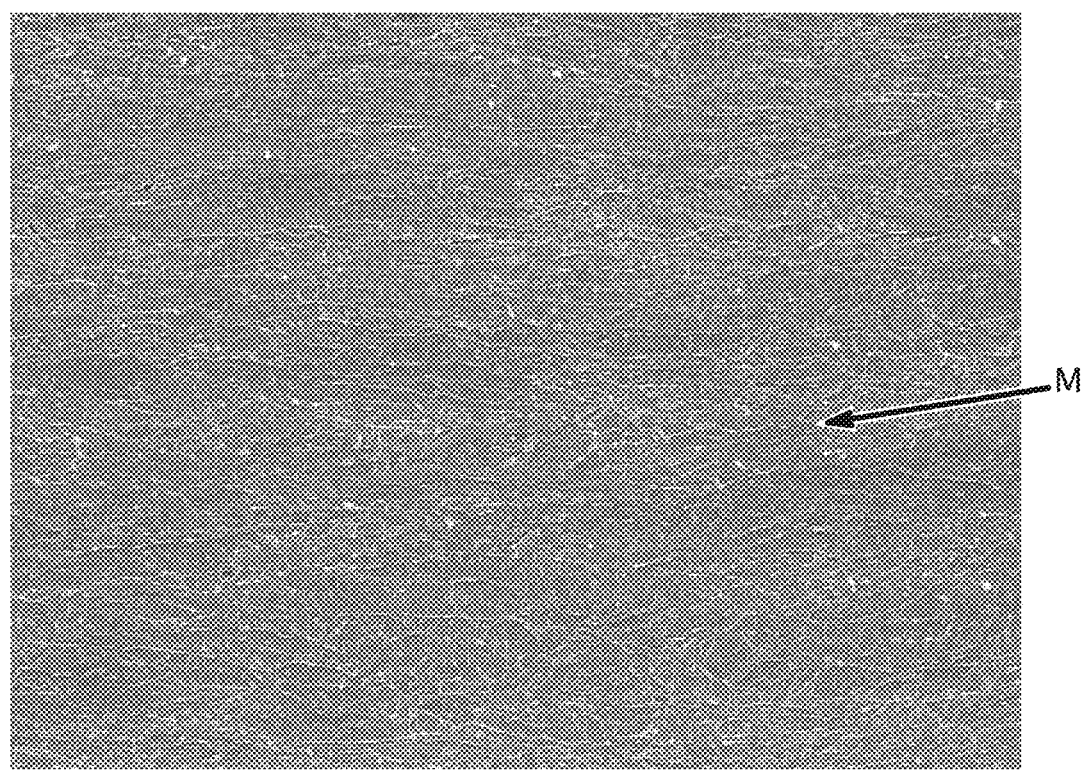

FIGS. 1, 2 and 3 show a comparison of the structure of Tests 11, 17 and 18 respectively. On these Figures, austenite (A) appears as a completely light grey or white zones, fresh martensite (M) appears as light grey zones and tempered martensite (Mt) appears as dark grey zones with or without small white particles representing carbides. MA refers to austenite/martensite islands.

The comparison of the structure of Test 11 (illustrated on FIG. 1) with the structure of Test 17 (illustrated on FIG. 2) shows that the combination of a hot forming step at a temperature comprised between 700° C. and 380° C. and a holding step at a temperature PT between QT and 470° C. according to the present disclosure provides a much finer and a more homogeneous structure than a method comprising a holding step but no hot forming step at a temperature comprised between 700° C. and 380° C.

The structure of Test 18, illustrated on FIG. 3, comprises essentially fresh martensite. This result shows that in the absence of a holding step allowing carbon partitioning in martensite, austenite almost totally transforms into fresh martensite upon cooling.

The consequences of these differences in structures on the mechanical properties of the sheets are emphasized by the comparison of the mechanical properties of Tests 3, 9, 15 and 16.

Similarly to Tests 11, 17 and 18, Tests 3, 9, 15 and 16 have the same composition, and were obtained by various manufacturing methods.

Tests 3 and 9 were obtained by a manufacturing method according to the present disclosure, comprising both a hot forming step at a temperature comprised between 700° C. and 380° C. and a holding step. Tests 3 and 9 both have a yield strength higher than 100 MPa, a tensile strength higher than 1600 MPa, a uniform elongation higher than 7%, a total elongation higher than 10%, and a product tensile strength× total elongation greater than 18000 MPa %.

On the contrary, Test 15 was obtained with a manufacturing method which did not comprise any hot forming step at a temperature comprised between 380° C. and 700° C. Test 15, although having good elongation properties, has an insufficient tensile strength, which is much lower than 1600 MPa, so that its product tensile strength×total elongation is lower than 18000 MPa %, and its product tensile strength× uniform elongation is lower than 13000 MPa %. In particular, owing to the absence of a hot forming step at a temperature comprised between 380° C. and 700° C. during the manufacturing of Test 15, the microstructure of Test 15 does not have martensite laths having an average size of less than 1 μm and an aspect ratio between 2 and 5.

Furthermore, Test 16, obtained with a manufacturing method which did not comprise any holding step allowing carbon partitioning in martensite, although having high yield strength and tensile strength, has insufficient uniform and total elongations, so that its product tensile strength×total elongation is much lower than 18000 MPa % and its product tensile strength×uniform elongation is much lower than 13000 MPa %.

These examples show that surprisingly, applying both a hot forming step at a temperature comprised between 700° C. and 380° C. and a holding step leads to a better couple of ductility and strength properties than the average elongations and strengths obtained with a hot forming step at a temperature comprised between 380° C. and 700° C. or a holding step.

Figure 4:
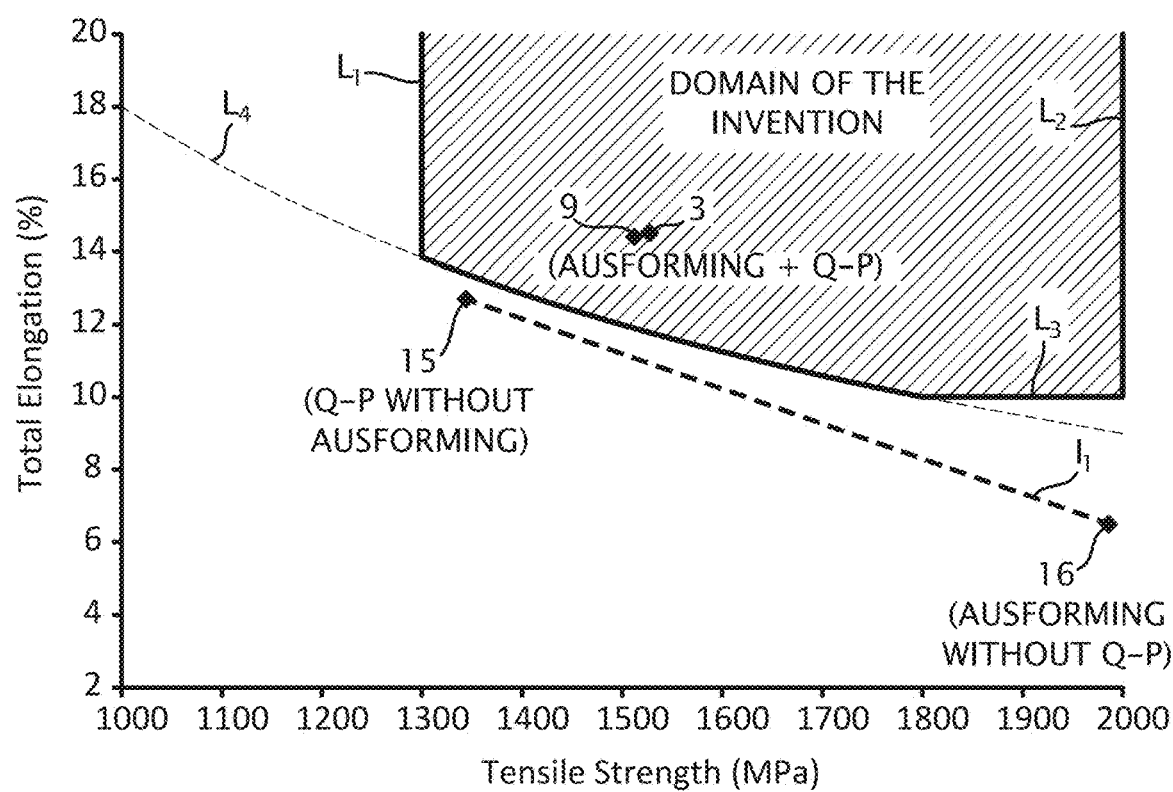
FIGS. 4, 5 and 6 are graphs comparing the mechanical properties of steels products obtained by manufacturing methods which are either in accordance or not in accordance with the present disclosure.
Figure 5:
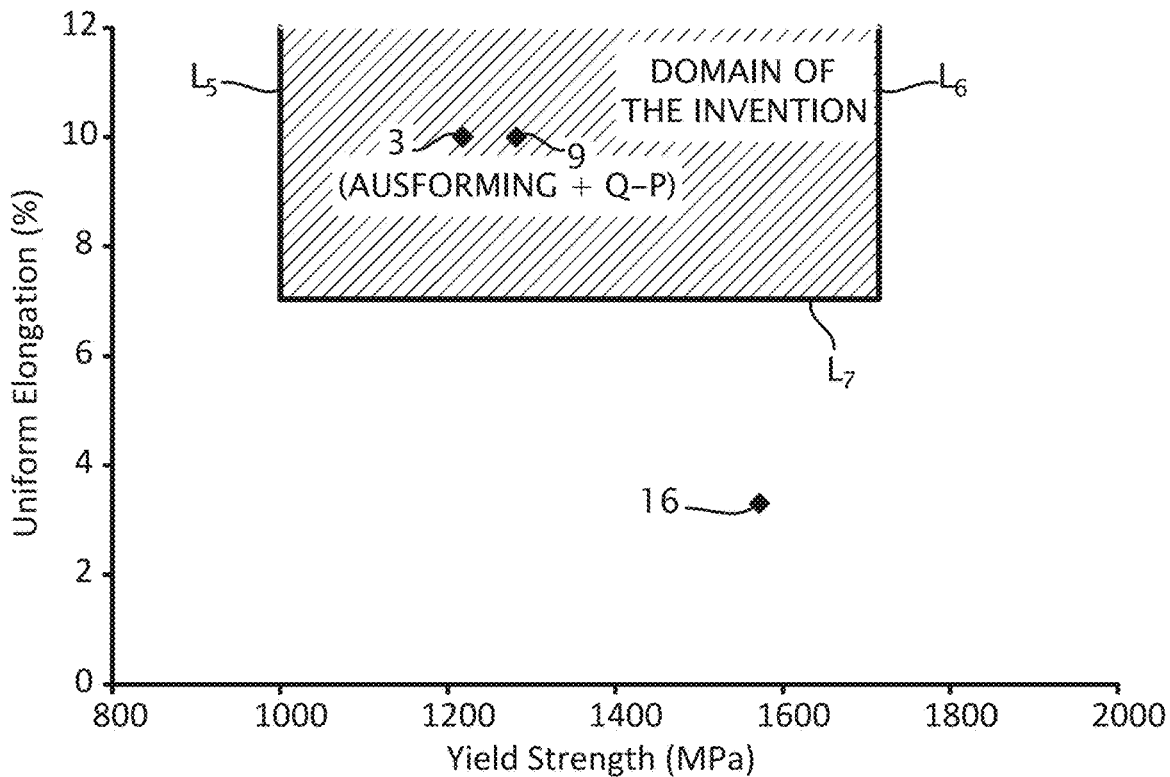
Figure 6:
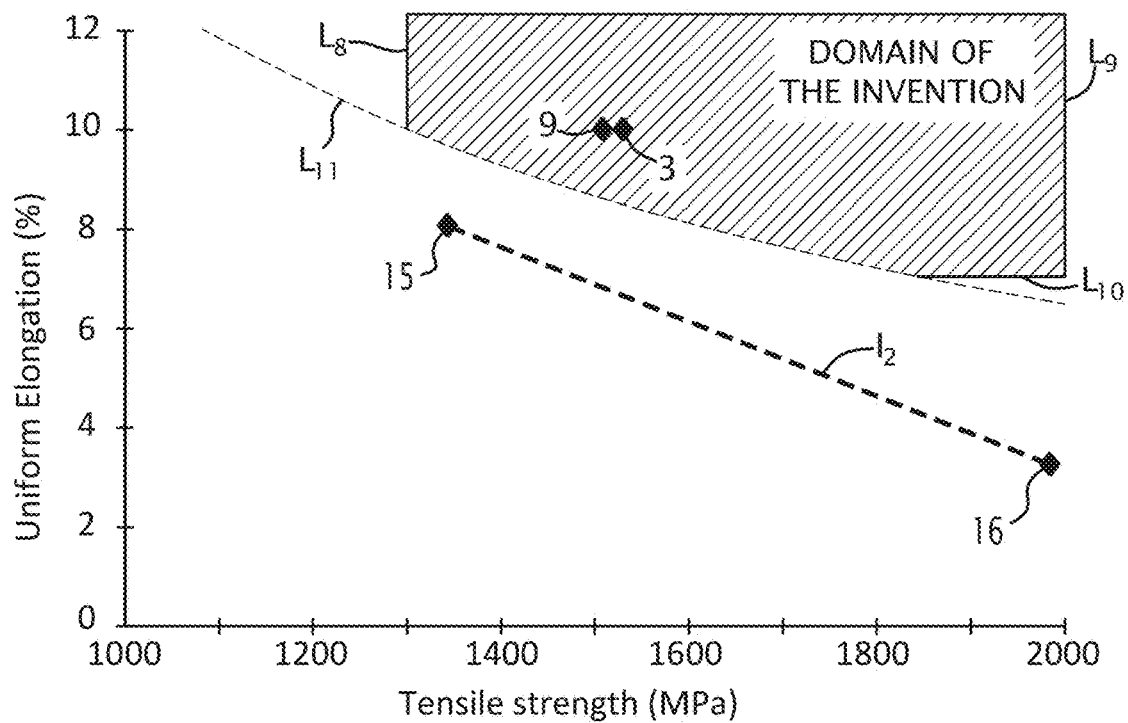

This effect is illustrated on FIGS. 4, 5 and 6.

FIG. 4 is a graph representing the total elongation TE of Tests 3, 9, 15 and 16 as a function of their tensile strength TS. The domain of the present disclosure is delimited by lines L1 (TS=1300 MPa), L2 (TS=2000 MPa), L3 (TE=10%) and L4 (TS×TE=18000 MPa %).

FIG. 4 shows that the couple total elongation/tensile strength obtained by a manufacturing method according to the present disclosure, comprising both a hot forming step at a temperature comprised between 700° C. and 380° C. and a holding step, is much better than the couple total elongation/tensile strength obtained by a manufacturing method comprising only a hot rolling step at a temperature comprised between 700° C. and 380° C. (Test 15) and the total elongation/tensile strength obtained by a manufacturing method comprising only a holding step (Test 16). This intermediate total elongation/yield strength is illustrated on FIG. 4 by line I1.

Furthermore, these results show that surprisingly, the method according to the present disclosure provides a product tensile strength×total elongation higher than 18000 MPa %, whereas such a high value is not obtained along line I1.

FIG. 5 is a graph representing the uniform elongation UE of Tests 3, 9, 15 and 16 as a function of their yield strength YS. The domain of the present disclosure is delimited by lines L5 (YS=1000 MPa), L6 (YS=1700 MPa) and L7 (UE=7%).

Similarly to FIG. 4, FIG. 5 shows that the uniform elongation and the yield strength obtained by a manufacturing method according to the present disclosure is much better than the uniform elongation/yield strength obtained by a manufacturing method comprising only a holding step (Test 16).

FIG. 6 is a graph representing the uniform elongation UE of Tests 3, 9, 15 and 16 as a function of their tensile strength TS. The domain of the present disclosure is delimited by lines L8 (TS=1300 MPa), L9 (TS=2000 MPa), L10 (UE=7%) and L11 (TS×UE=13000 MPa %).

FIG. 6 shows that the couple uniform elongation/tensile strength obtained by a manufacturing method according to the present disclosure, comprising both a hot forming step at a temperature comprised between 700° C. and 380° C. and a holding step, is much better than the couple total elongation/tensile strength obtained by a manufacturing method comprising only a hot rolling step at a temperature comprised between 700° C. and 380° C. (Test 15) and the total elongation/tensile strength obtained by a manufacturing method comprising only a holding step (Test 16). This intermediate uniform elongation/yield strength is illustrated on FIG. 6 by line I2.

Furthermore, these results show that surprisingly, the method according to the present disclosure provides a product tensile strength×uniform elongation higher than 13000 MPa %, whereas such a high value is not obtained along line I2.

The sheets or parts thus produced may be used to manufacture automotive parts such as front or rear rails, pillars, bumper beams.

What is claimed is:

1. A steel product having a composition consisting of, in percent by weight:

$0.15\% \leq C \leq 0.40\%$, $1.5\% \leq Mn \leq 4.0\%$, $0.5\% \leq Si \leq 2.5\%$, $0.005\% \leq Al \leq 1.5\%$, with $0.8\% \leq Si+Al \leq 2.5\%$, $S \leq 0.05\%$, $P \leq 0.1\%$, $Nb \leq 0.1\%$, $Ti \leq 0.1\%$, $Ni \leq 3.0\%$, $0.0005\% \leq B \leq 0.005\%$, $0.0005\% \leq Ca \leq 0.005\%$ at least one element chosen among Cr and Mo, such that:

$0\% \leq Cr \leq 4.0\%$, $0\% \leq Mo \leq 0.5\%$, and $2.7\% \leq Mn+Cr+3\ Mo \leq 5.7\%$, a balance of the composition consisting of iron and unavoidable impurities resulting from smelting,
a structure of at least one location of the steel product consisting of:
tempered martensite or laths of martensite without carbides, with an area percentage of at least 40%, the martensite laths having an average size less than 1 μm, said martensite laths having an aspect ratio comprised between 2 and 5, said tempered martensite and the martensite laths comprising, in area percentage, less than 0.5% of carbides, as compared to a surface of said tempered martensite and martensite laths, fresh martensite, the fresh martensite having a shape of islands or films, an area percentage of said fresh martensite being between 5% and 30%, and austenite, with an area percentage of 5% to 35%.

2. The steel product according to claim 1, wherein a product of a tensile strength TS of the steel by a uniform elongation UE of the steel is greater than or equal to 13000 MPa %.

3. The steel product according to claim 1, wherein the islands of fresh martensite having an aspect ratio lower than 3 have a maximal size lower than 3 μm.

4. The steel product according to claim 1, wherein the structure has an average prior austenitic grain size lower than 30 μm.

5. The steel product according to claim 1, wherein the structure has a prior austenitic grain aspect ratio higher than 1.3.

6. The steel product according to claim 1, wherein said austenite is in a shape of films or islands, a smallest dimension of said films or islands being lower than 0.3 μm, a largest dimension of said films or islands being lower than 2 μm on average.

7. The steel product according to claim 1, wherein said carbides have an average size lower than 50 nm.

8. The steel product according to claim 1, wherein said steel product is a steel sheet, and the whole of the steel sheet has a structure consisting of:

tempered martensite or laths of martensite without carbides, with an area percentage of at least 40%, fresh martensite, the fresh martensite having a shape of islands or films, an area percentage of said fresh martensite being comprised between 5% and 30%, and austenite, with an area percentage from 5% to 35%.

9. The steel product according to claim 1, wherein said steel product is a hot stamped steel part, and a structure of at least 20% of a volume of said hot-stamped steel part consists of:

tempered martensite or laths of martensite without carbides, with an area percentage of at least 40%, fresh martensite, the fresh martensite having a shape of islands or films, an area percentage of said fresh martensite being comprised between 5% and 30%, and austenite, with an area percentage from 5% to 35%.

10. The steel product according to claim 9, wherein said steel product comprises at least one coating layer.

11. The steel product according to claim 10, wherein said coating layer is zinc or zinc-based alloy, or aluminum or aluminum based alloy.

12. The steel product according to claim 11, wherein said coating layer is applied before hot stamping.

* * * * *